United States Patent [19]

Vanderlaan et al.

[11] Patent Number: 4,596,970
[45] Date of Patent: Jun. 24, 1986

[54] LIMITED ANGLE TORQUE MOTOR WITH HIGH STIFFNESS AND NATURAL FREQUENCY

[75] Inventors: Robert D. Vanderlaan; Joseph A. Kelemen, both of Kalamazoo, Mich.

[73] Assignee: Pneumo Corporation, Boston, Mass.

[21] Appl. No.: 685,034

[22] Filed: Dec. 21, 1984

[51] Int. Cl.$^4$ ............................................. H01F 7/08
[52] U.S. Cl. .................................... 335/229; 335/274; 310/36
[58] Field of Search ............... 335/229, 230, 266, 267, 335/272, 274; 310/29, 36

[56] References Cited

U.S. PATENT DOCUMENTS

| | | | |
|---|---|---|---|
| 3,157,803 | 11/1964 | Graydon | 335/229 X |
| 3,214,646 | 10/1965 | Duff | 335/229 |
| 3,234,436 | 7/1966 | Bieger | 310/36 X |
| 3,694,782 | 9/1972 | Ray | 335/230 |
| 4,227,164 | 10/1980 | Kitahara | 310/36 X |

Primary Examiner—George Harris
Attorney, Agent, or Firm—Renner, Otto, Boiselle & Lyon

[57] ABSTRACT

Limited angle torque motor includes a motor power section comprising a rotor assembly having one or more permanent rotor magnets which are magnetized in a diametrical direction and a stator assembly surrounding the rotor assembly. The magnetic flux in the motor power section produces an inherent magnetic centering spring rate tending to keep the rotor assembly at the midpoint of its rotational angle range. However, when a direct or pulse width modulated current is applied to the stator windings, a cross flux is produced through the stator and rotor assemblies of the motor power section which produces the desired limited rotational angle range for the rotor assembly. The motor also includes a separate magnetic centering spring section which provides another centering spring function in addition to the basic centering spring function inherent in the motor power section. The magnetic centering spring section is located immediately adjacent to the motor power section, and the permanent rotor magnet of the rotor assembly extends into the centering spring section, such centering spring section additionally including two or more permanent magnets with polarities in alignment with respect to the rotor magnet.

17 Claims, 7 Drawing Figures

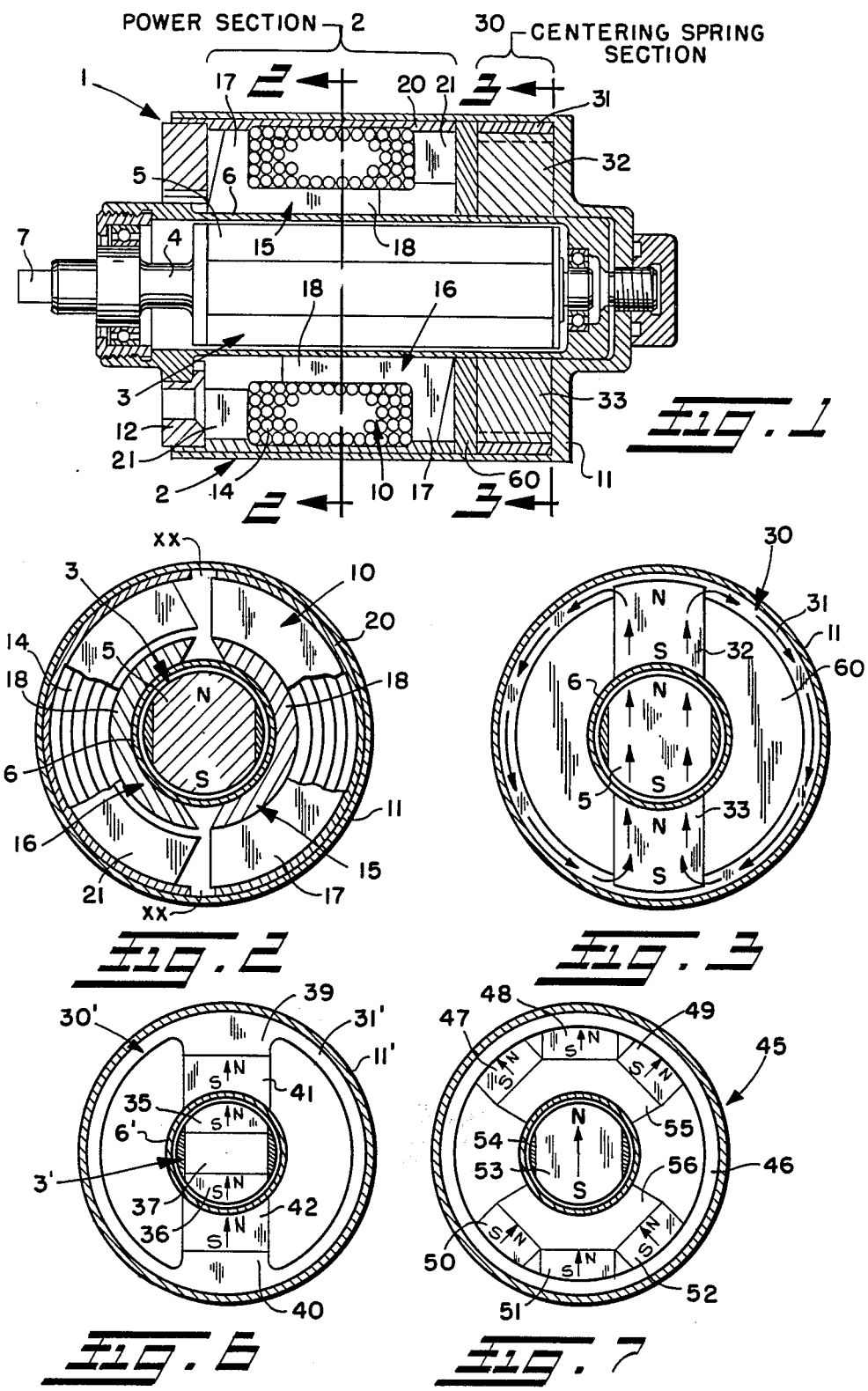

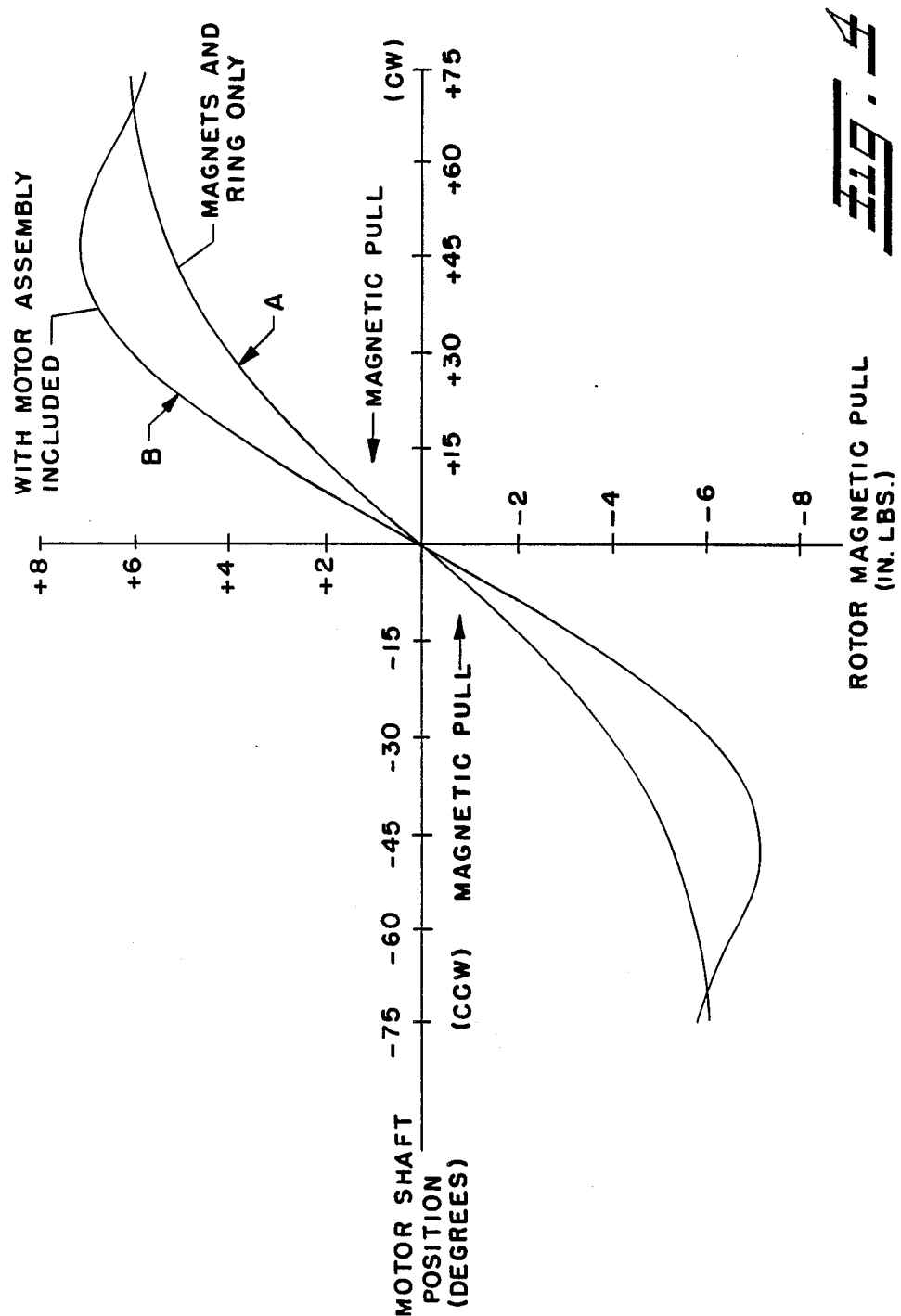

LIMITED ANGLE TORQUE MOTOR WITH HIGH STIFFNESS AND NATURAL FREQUENCY

BACKGROUND OF THE INVENTION

This invention relates generally as indicated to a limited angle torque motor with high stiffness and natural frequency.

The motor of the present invention is desirably generally of the type disclosed in copending U.S. application Ser. No. 579,784, filed Feb. 13, 1984, now U.S. Pat. No. 4,510,403 the disclosure of which is incorpoarated herein by reference. Such motor is particularly suited for use in certain types of high pressure fluid proportional servo control systems including, but not limited to, aircraft controls to drive a proportional control valve of relatively short stroke. The fluid pressure is normally on the order of 1,000 psi or more.

In such a motor, the magnetic reluctance torque of the motor can be controlled within certain limits to obtain a particular desired inherent magnetic centering spring rate at a particular torque or power level. However, such a motor has a somewhat limited magnetic spring capability inherent in the design, and there are some applications in which it is desirable for the motor to have a higher centering spring gradient to increase the dynamic stiffness of a servo system as where the motor is being used to drive a load having substantial and varying force levels.

Such a motor also has a torsional undamped natural frequency which is generally related to the magnetic spring rate through the center position and rotational inertia of the rotor. Typically such natural frequencies have been limited to about 60 Hertz (Hz) for motors of practical design. However, for certain high response servo sustem applications, it is desirable to have a substantially higher motor natural frequency, on the order of 75 to 100 Hz or more.

SUMMARY OF THE INVENTION

With the foregoing in mind, it is a principal object of this invention to provide a limited angle torque motor with a relatively high spring gradient to increase the undamped natural frequency of the motor and/or provide high system stiffness when coupled to a servo system having significant and varying load forces.

These and other objects of the present invention may be achieved by providing a two-pole limited angle torque motor with a separate magnetic centering spring section in addition to the usual motor power section. The motor power section generally comprises a rotor assembly having one or more permanent rotor magnets which are magnetized in the diametrical direction and a stator assembly surrounding the rotor assembly. The magnetic flux in the motor power section produces an inherent centering spring rate tending to keep the rotor assembly at the midpoint of its rotational angle range. However, when a direct or pulse width modulated current is applied to the stator windings, a cross flux is produced through the stator and rotor assemblies of the motor power section which produces the desired limited rotational angle range for the rotor assembly.

In accordance with the present invention, the motor is provided with a relatively simple, highly reliable magnetic centering spring section which is separate from the motor power section and provides another centering spring function in addition to the basic centering spring function inherent in the motor power section.

Also in accordance with the invention, the magnetic centering spring section is desirably located axially adjacent the motor power section.

Further in accordance with the invention, the rotor assembly with its permanent rotor magnet is extended beyond the motor power section into the magnetic centering spring section.

Still further in accordance with this invention, the centering spring section additionally includes two or more permanent magnets with polarities in alignment with respect to the extended portion of the rotor magnet.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary longitudinal section through one form of limited angle torque motor in accordance with the present invention;

FIG. 2 is a fragmentary transverse section through the motor power section of the motor of FIG. 1 taken substantially along the plane of the line 2—2 thereof;

FIG. 3 is a transverse section through the magnetic centering spring section of the motor of FIG. 1 taken substantially along the plane of the line 3—3 thereof;

FIG. 4 is a schematic diagram showing the rotor magnetic pull both of the magnetic centering spring section by itself and when combined with the inherent magnetic spring capability of the motor power section to increase the net centering gradient of the motor rotor;

FIGS. 6 and 7 are transverse sections similar to FIG. 3 but showing alternate forms of magnetic center spring sections for use in place of the centering spring section of FIG. 1.

DETAILED DESCRIPTION OF THE PREFERRED EMBODIMENTS

Figure 5:
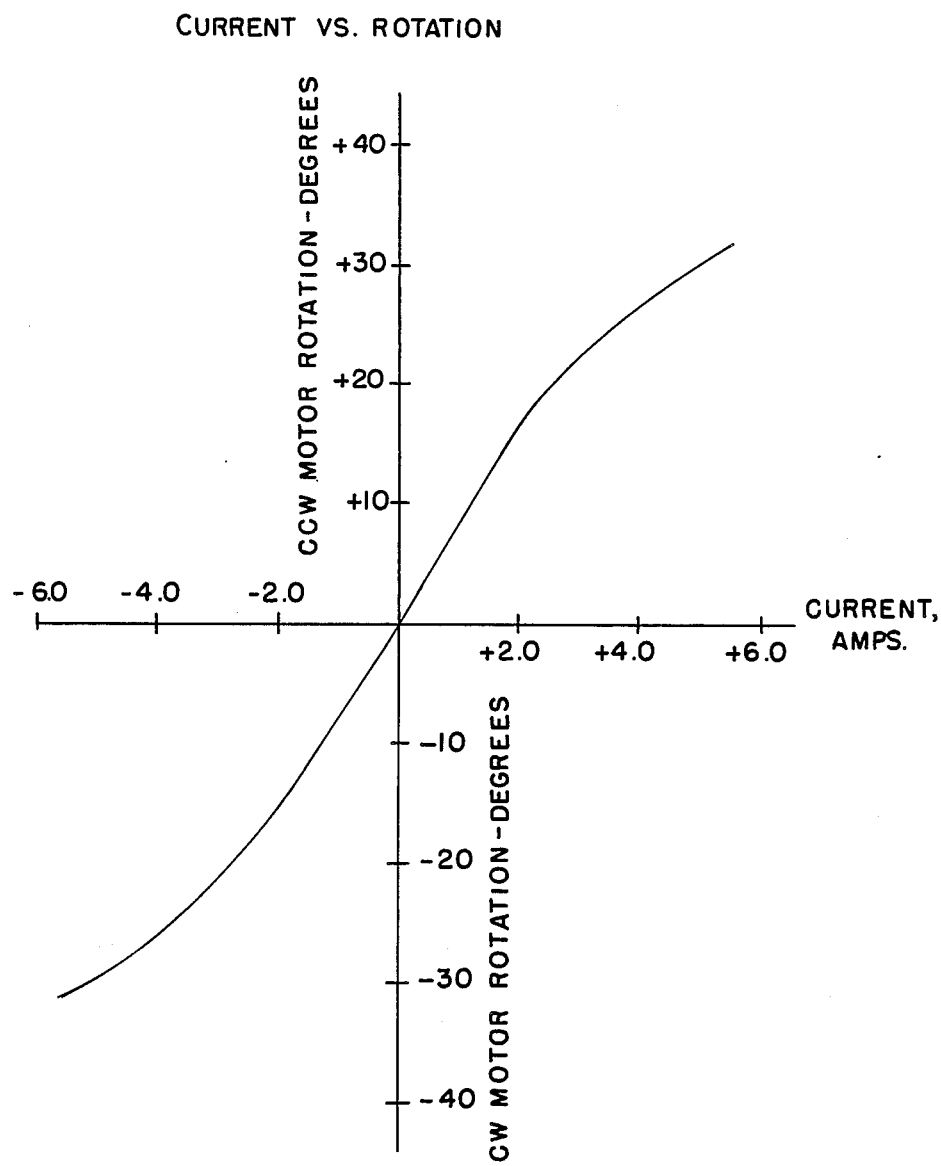
FIG. 5 is a graphic illustration showing the motor shaft position for different levels of applied direct or pulse width modulated current for a representative motor constructed in accordance with this invention.

Referring now in detail to the drawings, and initially to FIGS. 1 and 2, there is shown a preferred form of limited angle torque motor 1 in accordance with this invention. Such motor is primarily intended for use in high pressure fluid systems for directly driving a valve in proportional servo control systems including, but not limited to, aircraft controls. However, it should be understood that such motor could also be used for driving secondary valves as well as other mechanical devices.

Preferably, the motor is a non-commutated two-pole stationary coil rotary magnet motor having a motor power section 2 generally of the type disclosed in the aforementioned copending application Ser. No. 579,784. Such motor power section 2 includes a rotor assembly 3 having a rotor shaft 4 with one or more permanent magnets 5 supported for rotation therewith.

The rotor magnet or magnets 5 are preferably rare earth magnets made, for example, of samarium cobalt, and are magnetized in the diametrical direction, that is, the North and South poles N and S of the rotor magnets are diametrically oriented as shown in FIG. 2.

The rotor shaft 4 may be journal mounted in suitable bearings within a rotor casing 6. At the outer end of the rotor shaft is an eccentric or other suitable form of rotary to linear gearing 7 that may be used to translate the rotary movement of the rotor shaft to linear movement of a valve member or other external load through a suitable drive linkage, not shown.

Surrounding the rotor assembly is a stator assembly 10 which in turn may be contained within an exterior housing 11 having a mounting flange 12 at one end for use in attaching the motor to a valve housing or other suitable support structure. The stator assembly may include one or more high density layer wound stator coil windings 14 which extend around a pair of circumferentially spaced stator magnetic pole structures 15, 16 with the axis of the stator coils being generally parallel to the rotor axis. At the opposite end of each of the stator pole structures is a stator pole flange 17 which extends radially outwardly from the respective stator pole blade 18, whereby when the stator coil windings 14 are excited by a direct or pulse width modulated current, the stator pole fanges will cause a cross or transverse flux through the stator and rotor assemblies which produces a turning torque in the motor for turning the rotor shaft through a limited rotational angle range.

A magnetic housing 20 made of a suitable magnetic material such as soft iron surrounds the stator assembly, and the stator magnetic pole flanges 17 desirably extend radially outwardly into contact with the overlapping inner surface of the outer magnetic housing which provides a magnetic return path for the magnetic field when the stator coil is excited. Such magnetic return path may be partially interrupted to strengthen the centering spring tendency by providing one or more air gaps xx, xx in the outer magnetic housing shown in FIG. 2. The stator magnetic pole structures 15, 16 may be internally supported by a suitable coil support sleeve which may, for example, comprise the rotor casing 6. Also, at the ends of the stator pole structures opposite the stator pole flanges 17 suitable end plates 21 may be provided.

Such a motor power section 2 produces an interaction of magnetic fields torque when the stator coil 10 is excited which is proportional to the amount of direct or pulse width modulated current passing through the stator coil. When a positive current is applied, a positive torque tending to rotate the rotor shaft in a clockwise direction as viewed in FIG. 2 is produced over a relatively large excursion of the rotor shaft which varies, for example, from a maximum torque output at the null or centered position of the rotor shaft ($\theta = 0°$) to approximately 50% of the maximum torque output at ±60° of rotation of the rotor shaft from such centered or null position. Conversely, when a negative current is applied, a negative torque tending to rotate the rotor shaft in a counterclockwise direction is produced over the same excursion of the rotor shaft.

The magnetic flux of the rotor magnet 5 of the motor power section 2 also produces a magnetic reluctance torque providing an inherent magnetic centering spring rate tending to keep the rotor assembly at the midpoint of its rotational angle range. As will be apparent, this inherent magnetic centering spring capability of the motor power section may be effectively utilized to provide a centering function for returning the rotor shaft to the centered or null position whenever the current to the stator coil is interrupted.

However, some applications require a higher centering spring gradient than is obtainable with the inherent magnetic centering spring capability of a typical motor power section of the type described, as when it is desired to increase the dynamic stiffness of a servo system so that the torque motor can be used to drive a load having substantial and varying force levels. Also, such a motor power section as described has a torsional undamped natural frequency generally related to the magnetic spring rate through the center position and rotational inertia of the rotor which may not be high enough for certain high response servo system applications.

In accordance with the present invention, both the undamped natural frequency and centering spring gradient of the motor is substantially increased by providing the motor with a separate centering spring section 30 adjacent to the power motor section 2. In the motor construction shown in FIGS. 1 and 3, the centering spring section 30 consists of an outer ring 31 structure of highly permeable soft magnetic iron adjacent one end of the motor power section 2, with the rotor assembly 3 including its rotor magnet 5 extending coaxially into the outer ring 31, and a pair of rare earth magnets 32, 33 attached to the outer ring on diametrically opposite sides thereof with their polarities aligned with respect to the rotor magnet 5 as shown in FIG. 3.

As the curve A of FIG. 4 graphically illustrates, such a magnetic centering spring section 30 provides a strong centering tendency for the rotor shaft 4. Also, as curve B further illustrates, such magnetic spring capability of the magnetic centering spring section 30 combines with the inherent magnetic spring capability of the motor power section 2 to increase the net centering gradient of the motor. The typical rotational characteristic of such a motor with combined power and centering spring sections is further graphically illustrated in FIG. 5 in terms of shaft rotation versus applied current.

An alternate arrangement of the permanent magnets in the centering spring section and rotor assembly is shown in FIG. 6. There the rotor assembly 3' is shown as including a pair of permanent magnets 35, 36 in diametrical alignment with each other on opposite sides of a soft magnetic iron core 37 interposed therebetween. Also, the outer ring 31' of the magnetic centering spring section 30' is shown as having a pair of diametrically opposed extensions or poles 39, 40 extending radially inwardly therefrom to permit the use of shorter magnets 41, 42 in the centering spring section than would otherwise be required. The polarities of all of the magnets 35, 36 and 41, 42 are of course still aligned in substantially the same manner as shown in FIG. 3.

FIG. 7 shows still another form of magnetic centering spring section 45 in which the outer ring 46 is provided with a plurality of circumferentially spaced permanent magnets 47–49 and 50–52 on opposite sides of the rotor magnet 53 with the polarities of the respective permanent magnets aligned as shown to increase the magnetic field intensity at the rotor surface 54, and thus increase the spring gradient of the centering spring section 45. As shown in FIG. 7, the permanent magnets in the centering spring section may be supported in closely spaced relation to the inner surface of the outer ring 46 by a pair of magnetic blocks or holders 55, 56 attached to such inner surface on opposite sides thereof.

The holders may have notches or slots therein for receipt of the respective magnets. Also, the radial inner ends of the holders may be semi-cylindrical in shape to correspond substantially to the cylindrical outer surface of the rotor assembly and are in closely spaced relation to the outer diameter of the rotor assembly.

If desired, a non-magnetic spacer 60 may be inserted between the motor power section 2 and centering spring section 30 as further shown in FIGS. 1 and 3 to help isolate the sections from magnetic interactions that might otherwise degrade performance.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A limited angle torque motor comprising a motor power section including a rotor assembly having a permanent rotor magnet magnetized in the diametrical direction and a stator assembly surrounding said rotor assembly, and a separate magnetic centering spring section axially adjacent said motor power section, said centering spring section comprising an outer magnetic ring at one end of said stator assembly, said rotor assembly including said rotor magnet extending coaxially into said outer ring, and additional permanent magnets carried by said outer ring on diametrically opposite sides of the extended portion of said rotor assembly, the polarities of said additional permanent magnets being aligned with respect to said rotor magnet.

2. The motor of claim 1 wherein said rotor magnet produces a magnetic flux in said motor power section that provides an inherent magnetic centering spring rate tending to keep said rotor assembly at the midpoint of its rotational angle range, and said centering spring section produces an additional centering spring function assisting the inherent magnetic centering spring rate of said motor section in keeping said rotor assembly at such midpoint of its rotational angle range.

3. The motor of claim 1 wherein said centering spring section includes one additional permanent magnet on diametrically opposite sides of said rotor magnet.

4. The motor of claim 1 wherein said centering spring section includes a plurality of additional permanent magnets on diametrically opposite sides of said rotor magnet.

5. The motor of claim 1 wherein said outer ring has a pair of diametrically opposed projections extending radially inwardly from the opposite sides of said outer ring, said projections providing an attachment support for said additional permanent magnets.

6. The motor of claim 5 wherein said additional permanent magnets are attached to the radial inner ends of said projections.

7. The motor of claim 5 wherein said projections comprise holders for a plurality of additional permanent magnets on opposite sides of said rotor magnet.

8. The motor of claim 7 wherein said holders have slots therein for receipt of said additional permanent magnets.

9. The motor of claim 8 wherein said additional permanent magnets are supported by said holders in closely spaced relation to the inner peripheral surface of said outer ring, and said holders extend radially inwardly into close proximity to the outer surface of the extended portion of said rotor assembly.

10. The motor of claim 9 wherein the radial inner ends of said holders are semi-cylindrical to correspond substantially to the cylindrical outer surface of the extended portion of said rotor assembly.

11. The motor of claim 1 further comprising a non-magnetic spacer between said motor power section and centering spring section to help isolate said sections from magnetic interactions that might otherwise degrade performance.

12. A limited angle torque motor comprising a motor power section including a rotor assembly having a permanent rotor magnet magnetized in the diametrical direction and a stator assembly surrounding said rotor assembly, and a magnetic centering spring section mounted adjacent one end of said motor power section, said rotor assembly including said rotor magnet extending into said centering spring section, and said centering spring section including additional permanent magnets on diametrically opposite sides of said rotor assembly with their poles aligned with respect to said rotor magnet, and motor power section including means for providing an inherent magnetic centering spring rate tending to keep said rotor assembly at the midpoint of its rotational angle range, and said centering spring section including means for producing an additional centering spring function assisting the inherent magnetic centering spring rate in keeping said rotor assembly at such midpoint of its rotational angle range.

13. The motor of claim 12 wherein said centering spring section includes a plurality of additional permanent magnets on diametrically opposite sides of the extended portion of said rotor assembly.

14. The motor of claim 12 wherein said centering spring section includes an outer ring for supporting said additional permanent magnets in radially spaced relation from the extended portion of said rotor assembly.

15. The motor of claim 14 wherein said outer ring includes holders on diametrically opposite sides thereof for additional permanent magnets.

16. The motor of claim 15 wherein a plurality of additional permanent magnets are supported by each of said holders on diametrically opposite sides of the extended portion of said rotor assembly.

17. The motor of claim 12 further comprising a non-magnetic spacer between said motor power section and centering spring section to help isolate said sections from magnetic interactions that might otherwise degrade performance.

* * * * *